Sept. 30, 1958     E. O. SHREFFLER     2,854,231
ADJUSTABLE MEMBER FOR COIL SPRINGS
Filed June 4, 1954
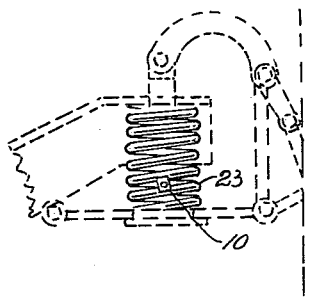
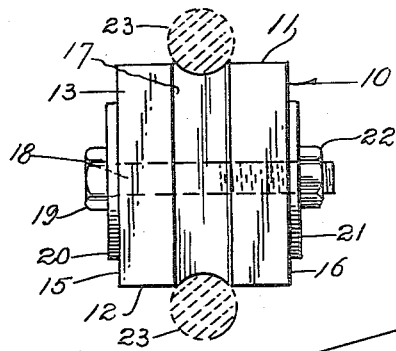
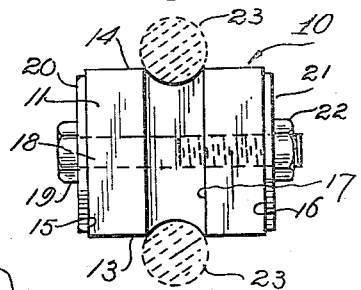
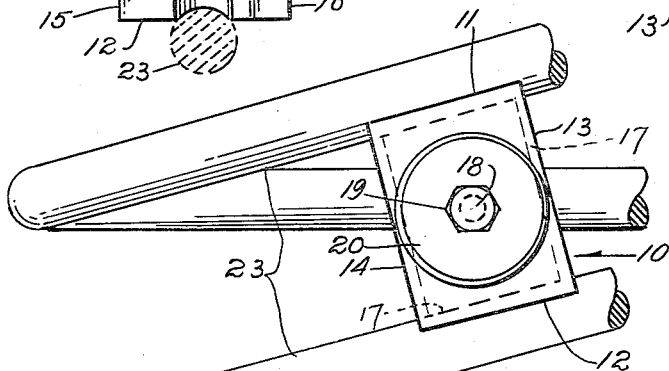
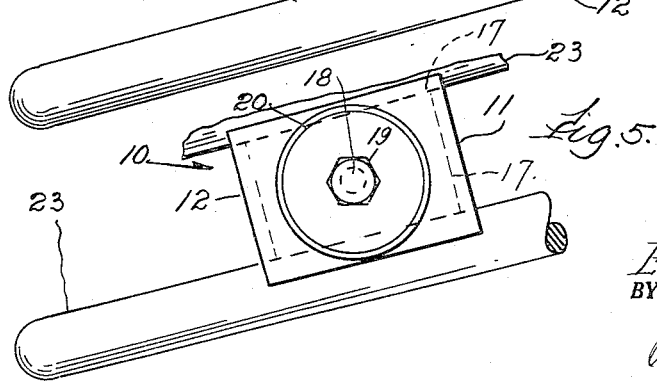
INVENTOR.
Elwyne O. Shreffler.
BY James R. McKnight
Attorney.

United States Patent Office 2,854,231
Patented Sept. 30, 1958

2,854,231
ADJUSTABLE MEMBER FOR COIL SPRINGS

Elwyne O. Shreffler, Manteno, Ill.

Application June 4, 1954, Serial No. 434,397

2 Claims. (Cl. 267—33)

This invention relates to a means for restoring weak coil springs of an automobile so that the front end of the car is raised to its original height for proper wheel alignment. A few cars also use coil springs on the rear end and my device is equally usable in such springs. Since, however, my device is primarily used with coil springs in the front end of the car, I will hereinafter refer to the front end of the car with the understanding that the device will be equally successful if used in the coil springs in the rear end of a car.

Among the objects of my invention is to provide a readily attachable member for restoring the proper tension to a coil spring so as to restore the front end of an automobile to its normal height, prevent hard steering and excessive tire wear due to improper wheel alignment, save expensive replacement of springs and restore the car to satisfactory operation. Another object is to provide an adjustable member for varying heights from time to time between the coils of a spring so as to maintain desired height and consequent proper wheel alignment.

Still another object is to create a retaining member for springs which will resist undue compression of the spring and provide improved support therefor.

My invention contemplates such other objects, advantages, and capabilities as will later more fully appear and which are inherently possessed in my invention.

While I have shown in the accompanying drawing the preferred embodiment of my invention, yet it is to be understood that the same is susceptible of modification and change without departing from the spirit of my invention. Referring to the drawing, Fig. 1 is an elevational view of a coil spring with my adjustable member in position between two of the coils of the spring; Figs. 2 and 3 are elevational views of my addjustable member in maximum tightened position, for its greatest height; and Figs. 4 and 5 show my adjustment member in position between the coils of a spring.

Coil springs are used in the front end of current model automobiles as suspension members. After several thousands of miles of travel, these coil springs tend to sag to a degree so that the front end alignment of the car is affected. This causes hard steering, rough riding, rolling on the corners, squealing tires and greater tire wear. In order to correct this condition new springs may be installed to replace old springs, but this is expensive, and a time consuming shop job taking the car out of use.

By inserting one or more of my adjustable members between the coils of a weak coil spring, this lengthens the spring to the desired height so that the end of a car is raised to the desired height for proper wheel alignment.

My invention provides an inexpensive means for restoring the coil springs of a car to satisfactory operating condition, thus automatically assuring proper wheel alignment, raising the end of the car to normal height, preventing hard steering and excessive tire wear, and restoring the coil springs to function in a satisfactory manner without any expensive replacement.

The embodiment selected to illustrate my invention comprises a body member 10 having opposite top and bottom portions 11 and 12, opposite front and rear portions 13 and 14, and opposite side portions 15 and 16. I provide a substantially, centrally positioned inwardly curved recess 17 extending across top and bottom portions 11 and 12, and extending the height of front and rear portions 13 and 14.

A screw threaded bolt 18 extends through body member 10 with its head 19 bearing against a washer 20, contacting side portion 15 and its other end extending through side portion 16. Another washer 21 is held against side portion 16 by threaded nut 22 on bolt 18.

In operation my body member 10 is generally inserted between two of the coils of coil spring 23 by spreading the coils apart with a flat bar or other suitable tool. The curved recess portion of base portion 12 is usually placed upon a lower coil of spring 23, and the concave portion of upper portion 11 contacts the coil above. Once the device has been inserted the pressure of coil spring 23 prevents its accidental removal. The effect of my device in operation is to strengthen and lengthen the spring and thus restore the spring to condition for satisfactory use.

It is to be noted that my body member has greater height than depth in that front and rear portions 13 and 14 are of greater extent than top and bottom portions 11 and 12. When it is desired that less height be restored to a worn spring, I place my body member on the spring so that the recess of front portion 13 contacts a lower coil of coil spring 23 and the recess of rear portion 14 is positioned against the coil thereabove.

When the body member 10 is positioned between the coils of spring 23, the weight on the spring tends to squeeze out or spread the body member. My construction, however, acts to prevent this squeezing out at substantially right angles to the coil and helps maintain the height of the body member. A certain amount of squeezing of the body member on substantially the same axis as the coil is permitted as this is not harmful as such bulge tends to support the load of the coil. Spreading out at right angles to the coil would however support but little load, and would tend substantially to lower the height of the body member. My construction prevents this from happening.

In addition to this increased support, my device may be adjusted from time to time as the spring becomes weaker from further use. Upon tightening the nut 22, height may be maintained under pressure by my device. Therefore as more height is needed from time to time, my construction permits adjustment by the tightening of nut 22 on bolt 18 for tightening the body member against spring compression.

While I prefer to make my body member of rubber or synthetic rubber, yet any suitable compressible or elastic material may be used. Because of my bolt construction, greater strength is obtained with less rubber or other suitable compressible material. This results again in greater economy.

The result of my device in use is that a cushion member is provided which is adjustable for coil springs of different types of cars and stages of breakdown due to use. My device increases the life of the coil springs substantially because it helps them support the load. My member being adjustable permits fine, close and accurate adjustments.

Having thus described my invention, I claim:

1. In combination with a coil spring, an adjustable member for raising the height of the coil spring comprising a compressible body member positioned between the coils of the coil spring, a washer contacting one of the side walls of said body member, a screw threaded bolt with its head bearing against said washer, another washer contacting the opposite side wall of said body member, said bolt extending through said washers and through said body member at substantially right angles to the axis of the coils of the coil spring at their points of contact with said body member, a screw threaded nut mounted on said bolt and bearing against said second mentioned washer, said nut adapted to be tightened on said bolt to help maintain the height of said body member.

2. In combination with a coil spring, an adjustable member for raising the height of a coil spring comprising a compressible rubber one piece body member positioned with a lower part resting on one of the coils of the coil spring and an upper part engaging the coil of the coil spring thereabove, a bolt having a head and a shank with the head contacting one of the side walls of the body member and the shank extending therethrough and a nut mounted on said bolt and engaging the other side wall of said body member, said bolt being substantially at right angles to the axis of the coils of the coil spring contacting said body member, said nut adapted to be tightened on said bolt to help maintain the height of said body member.

References Cited in the file of this patent

UNITED STATES PATENTS

| | | |
|---|---|---|
| 1,639,636 | Blomgren | Aug. 16, 1927 |
| 1,688,682 | Blomgren | Oct. 23, 1928 |
| 1,832,184 | Christen | Nov. 17, 1931 |
| 2,230,340 | Shreffler | Feb. 4, 1941 |
| 2,673,084 | Blythe | Mar. 23, 1954 |